April 14, 1953  F. LIOTTA  2,635,227
VEHICLE SIGNALING DEVICE
Filed Feb. 28, 1952
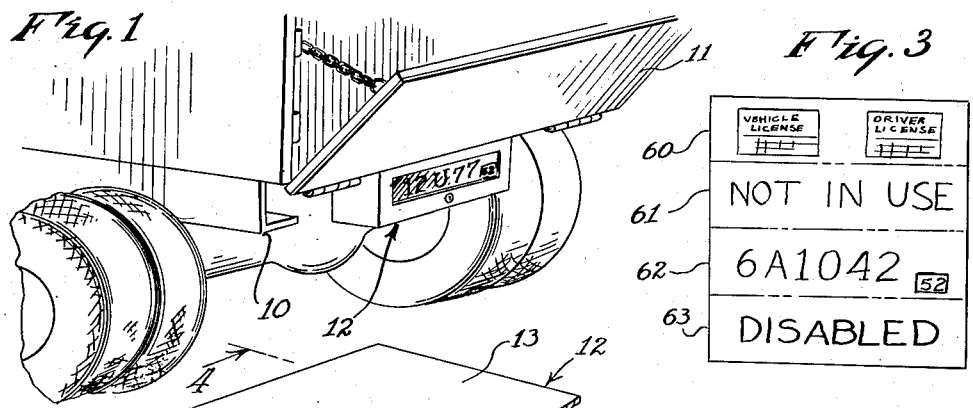
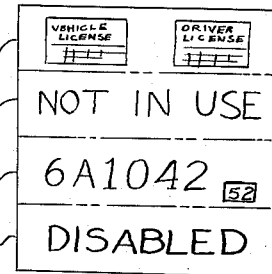
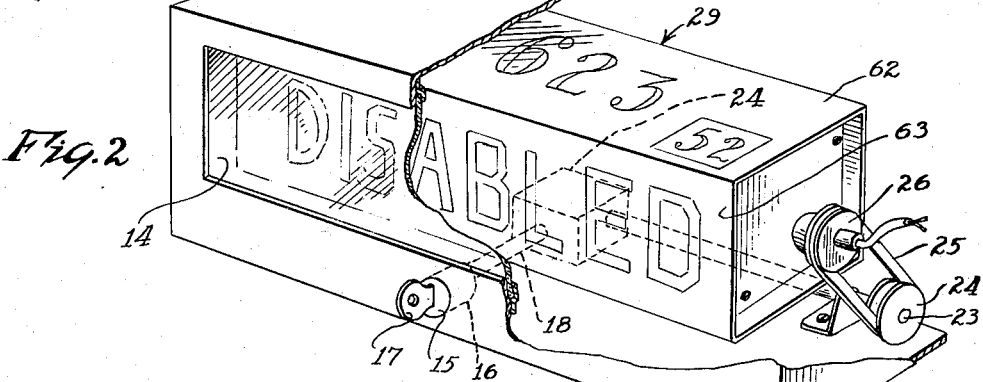
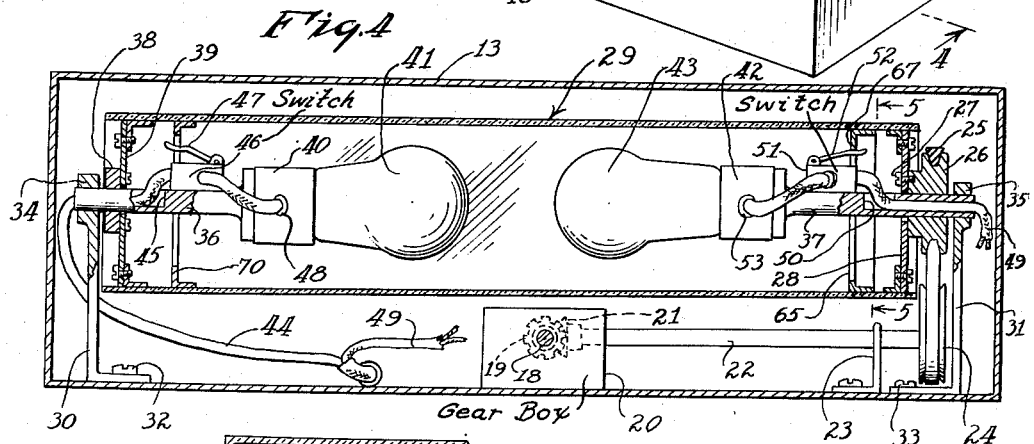
INVENTOR.
FRANK LIOTTA
BY L. S. Saulsbury
ATTORNEY

Patented Apr. 14, 1953

2,635,227

UNITED STATES PATENT OFFICE 2,635,227

VEHICLE SIGNALING DEVICE

Frank Liotta, Brooklyn, N. Y.

Application February 28, 1952, Serial No. 273,859

7 Claims. (Cl. 340—22)

This invention relates to an annunciator, and more particularly to an annunciator for motor vehicles such as trucks, automobiles or the like.

A primary object of this invention is the provision of an annunciator whereby the condition of the vehicle may be indicated when not in use, for example disabled, and whereby the vehicle license number may be displayed while the vehicle is in use, or the registration number, license and other pertinent data displayed when required.

A further object of the invention is the provision of such a device having means whereby the various appropriate indicia may be selectively displayed but only by an authorized operator, the actuating means for changing the indicia comprising a lock operable only by the appropriate key.

Still another object of the invention is the provision of such a device provided with alternate red and white lights which will be automatically actuated in accordance with the indicia displayed.

Still another object of the invention is the provision of a device of this character which comprises a relative minimum of parts, which is sturdy and durable in construction, reliable and efficient in operation, and relatively simple and inexpensive to manufacture, assemble and install.

Still other objects will, in part, be obvious and in part be pointed out as the description of the invention proceeds, and shown in the accompanying drawing, wherein there is disclosed a preferred embodiment of this inventive concept.

In the drawings:

Figure 1 is a fragmentary perspective view of a motor vehicle having the annunciator of the instant invention applied thereto;

Fig. 2 is a perspective view of the annunciator, portions of the casing thereof being broken away, and certain concealed elements being shown in dotted lines;

Fig. 3 is a plan view of certain indicia which may be utilized in conjunction with the device;

Fig. 4 is an enlarged sectional view taken substantially along the line 4—4 of Fig. 2 as viewed in the direction indicated by the arrows;

Fig. 5 is a sectional view taken substantially along the line 5—5 of Fig. 4 as viewed in the direction indicated by the arrows.

Similar reference characters refer to similar parts throughout the several views of the drawings.

Referring now to the drawings in detail, and more particularly to Fig. 1, there is generally indicated at 10 a motor vehicle of any suitable type such as a truck or the like, which includes a tail gate at the rear end, indicated at 11, beneath which, or in any other appropriate location, may be located the annunciator, generally indicated at 12 of the instant invention. Annunciator 12 is comprised of an outer casing 13 which may be formed of metal or any other suitable material, and which is provided in one wall thereof with a transparent panel 14, through which the indicia, to be more fully described hereinafter, may be viewed. The casing 13 is provided with a lock 15 of any desired conventional type, but preferably including a rotatable barrel 16, adapted to be operated by means of a key 17 (see Fig. 2). Rotation of the barrel 16 will occasion rotation of a shaft 18, which terminates in a bevel gear 19, located in a suitable gear box 20, preferably located on the bottom wall of casing 13. Gear 19 engages a second bevel gear 21, at right angles thereto, rotation of which in turn occasions rotation of a shaft 22, journalled in a bracket 23 secured to the bottom wall of the casing, and terminating in a pulley 24. Pulley 24 is connected by means of a belt 25 with a second pulley 26, which is fixedly secured as by means of a screw 27 to the end wall 28 of a rectangular indicia-bearing housing generally indicated at 29.

The member 29 is adapted to be mounted for rotation on two upstanding brackets 30 and 31 respectively, each of generally L-shaped configuration, and secured as by means of bolts or rivets 32 and 33 respectively to the bottom wall of casing 13. Each of fixtures 30 and 31 terminates at its upper extremity in cylindrical apertured members 34 and 35 respectively within which is affixed tubular members 36 and 37 respectively. Tubular member 36 extends through a suitable bushing 38 affixed to end wall 39 of casing 29, to afford a support for the rotation of member 29, while as previously described, tubular member 37 extends through pulley 26 and end wall 28.

Tubular member 36 terminates in a light socket 40, provided with a white bulb 41, while tubular member 37 terminates in a light socket 42 provided with a red bulb 43.

Current for the bulb 41 is provided by means of a wire 44 which extends through tubular member 36, thence outwardly through an aperture 45 in the wall thereof through a switch 46 provided with a switch arm 47, and thence into the socket 40 as indicated at 48. Similarly, current is provided to the bulb 43 by means of a wire 49 which extends through tubular member 37 and thence out of an aperture 50 in the side thereof through a switch 51 provided with an actuating arm 52 and thence into the socket 42 through a connection 53.

Referring back now to the indicia-bearing member 29, which, as previously mentioned, is preferably, though not necessarily rectangular in configuration. Any suitable indicia may be displayed on the four sides thereof. For example, as best shown in Fig. 3, side 60 may carry the vehicle license, the registration card, the driver's license, or any other desired appropriate data. The side 61 may carry the notation not in use, while the side 62 will bear the license number.

Side 63 may carry such indicia as the word "Disabled" or any other appropriate notation.

It will thus be seen by rotation of the key 17 any appropriate side of indicia-bearing member 29 may be exposed in such manner as to be visible through panel 14.

Means are provided for the selective illumination by means of either white bulb 41 or red bulb 43 in accordance with the indicia-bearing display. For example, white light 41 will be illuminated when either the license number on side 62 or the vehicle registration on side 60 is exposed to transparent panel 14, while the red light 43 will be illuminated when either of sides 61 or 63 are correspondingly exposed. The means for effecting this selective illumination comprise, in the case of red bulb 43, a rectangular panel 65, having a substantially circular cut out in the center thereof, provided with two oppositely disposed cam surfaces 67 and 68. The cam surface 67 will with the parts in the position shown in the drawing be positioned directly under the side 62 or at right angles to the side 63. Thus, with the parts in the position shown, cam 67 will engage switch arm 52, which will in turn close the circuit to red bulb 43 in the manner previously described, thus illuminating the red bulb 43 when the "Disabled" indicia is displayed. Correspondingly, an 180 degree turn will cause contact 68 to engage switch arm 52 illuminating red light 43 for similar use in connection with side 61.

A similar cam member 70 identical in all respects to cam member 65 is provided adjacent switch 46 and switch arm 47. The arrangement is such, however, that the cam surfaces of cam 70 are disposed at right angles to those of cam 65 in such manner that white light 41 is illuminated when either side 60 or 62 of the indicia-bearing member 29 is exposed.

From the foregoing, the use and operation of the device should be readily understandable. Obviously, during the normal use of the motor vehicle side 62 bearing the license number would be exposed and illuminated by white light 41. In the event that for any reason the vehicle is stopped, and the operator is required to display his driver's license, registration card and such other data as may be necessary, he need merely rotate the key 17 a half turn which will then expose the side 60, also illuminated by white light 41 for appropriate inspection. Correspondingly, when the vehicle is not in use or disabled, the appropriate indicating panel therefor is exposed again by rotation of key 17, but under such conditions that the illumination is in red.

It will be apparent that this will also serve as a deterent to thieves or the like, since it would be inadvisable to drive the vehicle away while the indicia "Not In Use" was boldly displayed in red. The key actuated mechanism obviously precludes the exposure of other than selected indicia by none authorized persons. Correspondingly, the construction of the device is such that in order to turn member 29 without the use of the key would undoubtedly result in such damage as to disconnect one or both of the lights, thus rendering the device inoperative.

From the foregoing it will now be seen that there is herein provided an annunciator which accomplishes all the objects of this invention and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In an annunciator for vehicles, a housing, a transparent panel in one side of said housing, a multi-sided translucent indicia-bearing member, means for rotatively connecting said indicia-bearing member to said housing, indicia on each side of said member, key controlled means for selectively positioning one of said sides adjacent said panel and means interiorly of said indicia-bearing member for illuminating said indicia.

2. In an annunciator for vehicles, a housing, a transparent panel on one side of said housing, a multi-sided translucent indicia-bearing member, means for rotatively connecting said indicia-bearing member to said housing, indicia on each side of said member, key controlled means for selectively positioning one of said sides adjacent said panel and means interiorly of said indicia-bearing member for selectively illuminating said member in red or white in accordance with the exposed indicia.

3. In an annunciator for vehicles, a housing, a transparent panel on one side of said housing, a multi-sided translucent indicia-bearing member, means for rotatively connecting said indicia-bearing member to said housing, indicia on each side of said member, key controlled means for selectively positioning one of said sides adjacent said panel and means interiorly of said indicia-bearing member for selectively illuminating said member in red or white in accordance with the exposed indicia, said last mentioned means including a red bulb and a white bulb, a source of current for each bulb, a switch for controlling each source of current, and cam means for selectively opening one switch and closing the other in accordance with the position of said indicia-bearing member.

4. The construction of claim 3 wherein said cam means are fixed to and rotatable with said indicia-bearing member, and said switches are in permanently fixed position.

5. The construction of claim 1 wherein said key controlled means includes a rotatable lock barrel, a shaft rotatable therewith, a bevel gear on said shaft, a second bevel gear coacting with said first bevel gear, a second shaft rotatable by said second bevel gear and a connection between said second shaft and said indicia bearing member whereby rotation of said lock barrel rotates said member.

6. The construction of claim 5 wherein said connection comprises a pulley on said shaft, a second pulley fixed to said indicia-bearing member, and a belt connection between said pulleys.

7. The construction of claim 6 wherein each light bulb is fixed in a socket, and each socket comprises a part of a fixture secured in said housing, said indicia-bearing member being journalled for rotation on said fixtures.

FRANK LIOTTA.

References Cited in the file of this patent

UNITED STATES PATENTS

| Number | Name | Date |
|---|---|---|
| 1,176,201 | Cerf et al. | Mar. 21, 1916 |
| 1,191,278 | Cayer | July 18, 1916 |
| 1,242,690 | Headley, Jr. | Oct. 9, 1917 |
| 1,244,873 | Lohr | Oct. 30, 1917 |
| 1,309,222 | Schwartz | July 8, 1919 |
| 1,752,122 | Thieler | Mar. 25, 1930 |